US009413203B2

United States Patent
Jang et al.

(10) Patent No.: US 9,413,203 B2
(45) Date of Patent: Aug. 9, 2016

(54) FAN MOTOR

(71) Applicant: NEW MOTECH CO., LTD., Gwangju (KR)

(72) Inventors: Jeong Cheol Jang, Gwangju (KR); Gyeong Su Park, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 0 days.

(21) Appl. No.: 14/748,245

(22) Filed: Jun. 24, 2015

(65) Prior Publication Data

US 2016/0072355 A1 Mar. 10, 2016

(30) Foreign Application Priority Data

Sep. 5, 2014 (KR) .................... 10-2014-0118332

(51) Int. Cl.

| *H02K 5/10* | (2006.01) |
| *H02K 5/167* | (2006.01) |
| *H02K 5/08* | (2006.01) |
| *H02K 7/09* | (2006.01) |

(52) U.S. Cl.
CPC .............. *H02K 5/1672* (2013.01); *H02K 5/08* (2013.01); *H02K 7/09* (2013.01); *H02K 2205/03* (2013.01)

(58) Field of Classification Search
CPC .......... H02K 5/10; H02K 5/08; H02K 11/30; H02K 5/1672; H02K 7/09
USPC .................................... 310/87–89, 90, 90.5
See application file for complete search history.

(56) References Cited

U.S. PATENT DOCUMENTS

| 5,237,231 A * | 8/1993 | Blaettner .............. H02K 1/17 310/239 |
| 5,610,458 A * | 3/1997 | Baker .................... F04D 25/08 310/68 R |
| 6,577,031 B2 | 6/2003 | Morooka et al. |
| 6,747,383 B2 * | 6/2004 | Tornquist ............... F16C 25/08 310/156.16 |
| 7,262,532 B2 * | 8/2007 | Seidler .................... F04D 13/02 310/103 |
| 8,608,463 B2 * | 12/2013 | Huang ................. F04D 25/0693 310/68 R |
| 2002/0047391 A1 * | 4/2002 | Nakamura ............ F04C 23/008 310/90 |
| 2005/0023914 A1 * | 2/2005 | Chou .................. F04D 25/0613 310/91 |
| 2006/0091761 A1 * | 5/2006 | Lafontaine ............. H02K 1/187 310/261.1 |
| 2007/0247009 A1 * | 10/2007 | Hoffman ............. F04D 25/0606 310/51 |
| 2013/0221780 A1 * | 8/2013 | Kori ...................... H02K 5/161 310/89 |
| 2015/0180300 A1 | 6/2015 | Jang et al. |

FOREIGN PATENT DOCUMENTS

| KR | 10-0511324 B1 | 8/2005 |
| KR | 20-0422010 Y1 | 7/2006 |
| KR | 10-2010-0028927 A | 3/2010 |
| KR | 10-1074935 B1 | 10/2011 |
| KR | 10-2014-0037334 A | 3/2014 |

* cited by examiner

*Primary Examiner* — Naishadh Desai
(74) *Attorney, Agent, or Firm* — Revolution IP, PLLC

(57) ABSTRACT

A fan motor that including: a rotor coupled with a shaft to rotate together; a stator installed at a position facing the rotor; a first bracket on a central upper portion of which a first bearing insertion space into which a first bearing coupled to an upper portion of the shaft is inserted is formed; a second bracket which is hermetically coupled to the first bracket and on a central lower portion of which a second bearing insertion space into which a second bearing coupled to a lower portion of the shaft is inserted is formed; a first bearing cover that covers the first bearing insertion space; and a second bearing cover that covers the second bearing insertion space and has an accommodation space formed to extend to the central lower portion.

5 Claims, 6 Drawing Sheets

FAN MOTOR

CROSS-REFERENCE TO RELATED APPLICATION

This application claims under 35 U.S.C. §119(a) the benefit of Korean Patent Application No. 10-2014-0118332 filed on Sep. 5, 2014, the entire contents of which are incorporated herein by reference.

BACKGROUND (a) Technical Field

The present disclosure relates to a fan motor. More specifically, it relates to a fan motor that is capable of lowering the manufacturing costs due to a simple manufacturing process, and is capable of preventing noise and vibration, by minimizing the vertical movement of a shaft.

(b) Background Art

In general, a motor that is used for blowing the cold air of a refrigerator or circulating the internal and external air of any device is called as a fan motor. In many cases, such a fan motor is installed at a humid place or at an environment where dew condensation occurs depending on the temperature change. Thus, since moisture may penetrate into the motor to cause failures, various structures for preventing the failures have been studied.

Korean Patent Nos. 10-0511324 and 10-1074935 and U.S. Pat. No. 6,577,031 disclose a technique for fabricating a motor housing through the resin molding by insert injection, together with a motor stator and a printed circuit board. According to these patents, since the motor housing is manufactured through the resin molding such that the stator and the printed circuit board are buried in the interior of the housing, they have an efficient structure to prevent the moisture from penetrating into the inside of the motor.

However, when manufacturing the motor by the above-described insert injection, there is a problem of increases in the process and the cost required for the insert injection, such as fabricating a molding die. Moreover, since the method needs the insert injection process, there are difficulties in automating the entire processes.

In addition, in the fan motor according to the prior art, a shaft which rotates together with the rotor may be moved in a vertical direction, i.e., in an axial direction. The rotation of the fan may become slightly unstable due to the axial movement of the shaft, and the noise and vibration may occur accordingly.

In order to solve the above-mentioned problems, the present inventors suggest a fan motor of a novel structure that can be manufactured without depending on the insert injection process and prevent the movement of the shaft.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

An object of the present invention is to provide a fan motor of a new structure.

Another object of the present invention is to provide a fan motor which can reduce manufacturing costs, by not applying the insert injection for fabrication of the motor housing.

Still another object of the present invention is to provide a fan motor which can prevent the axial movement of the shaft.

Still further another object of the present invention is to provide a fan motor which can reduce manufacturing costs by omitting components such as a felt and a board push.

All the above objects and other inherent objects of the present invention can be readily accomplished by the invention described below.

In one aspect, the present invention provides a fan motor that includes: a rotor that is coupled with a shaft to rotate together; a stator that is installed at a position facing the rotor; a first bracket on a central upper portion of which a first bearing insertion space into which a first bearing coupled to an upper portion of the shaft is inserted is formed; a second bracket which is hermetically coupled to the first bracket and on a central lower portion of which a second bearing insertion space into which a second bearing coupled to a lower portion of the shaft is inserted is formed; a first bearing cover that covers the first bearing insertion space; and a second bearing cover that covers the second bearing insertion space and has an accommodation space formed to extend to the central lower portion, wherein the second bearing is coupled so as to abut against an upper portion and a side surface portion of the second bearing press-fit portion.

In a preferred embodiment, the first bearing may be supported by the first bearing press-fit portion formed in the first bearing insertion space, and the first bearing press-fit portion may abut against the upper portion and the side surface of the first bearing.

In a preferred embodiment, the fan motor may further include an attracting magnet that is fixed to the lower portion of the accommodation space, and a ring-shaped spacer that is fixed to the upper portion of the attracting magnet.

In still another preferred embodiment, the attracting magnet and the spacer may be a magnet formed integrally.

In yet another preferred embodiment, the fan motor may further include a spring installed in the lower portion of the accommodation space, and a support plate installed in the upper portion of the spring.

In still yet another preferred embodiment, a stopper configured to support the upper portion of the support plate may be formed in the upper portion of the accommodation space.

In a further preferred embodiment, the support plate may be a magnet.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
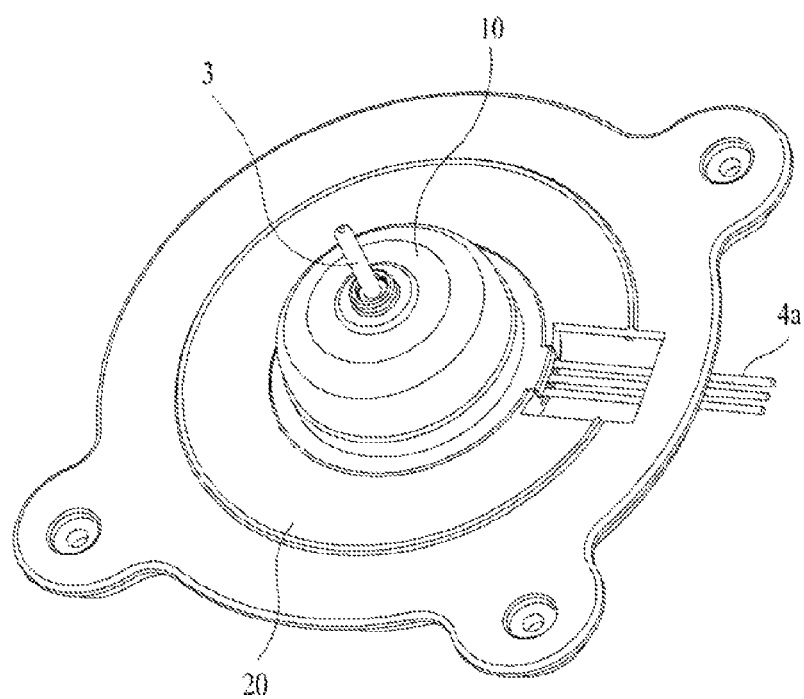
FIG. 1 is a perspective view illustrating a fan motor according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
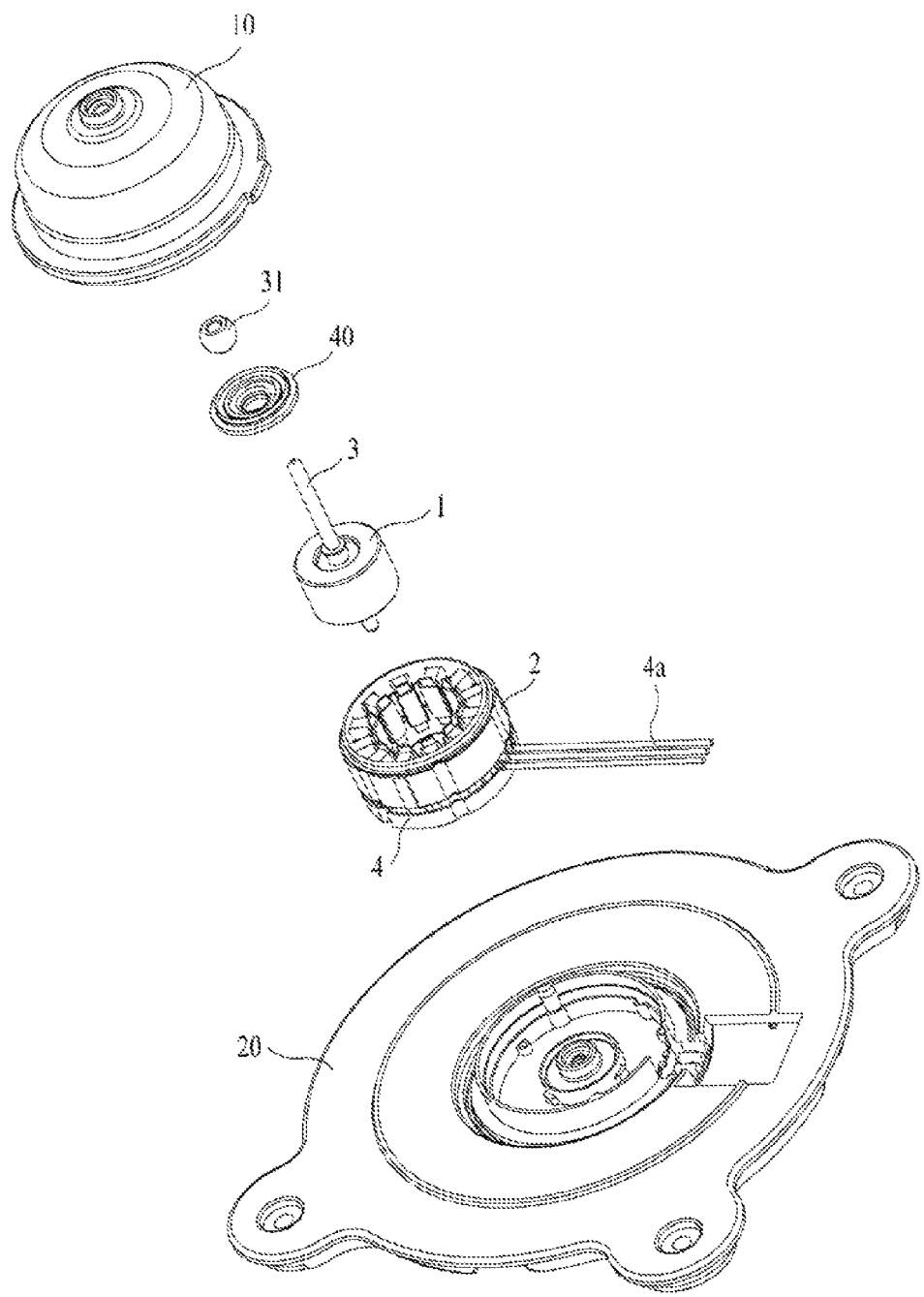
FIG. 2 is an exploded perspective view illustrating a fan motor according to the present invention.

FIG. 1 is a perspective view of a fan motor according to the present invention, and FIG. 2 is an exploded perspective view.

As illustrated in FIGS. 1 and 2, a fan motor according to an embodiment of the present invention is configured to mainly include a rotor 1, a stator 2, a shaft 3, a printed circuit board (PCB) 4, a first bracket 10 and a second bracket 20.

The first bracket 10 and the second bracket 20 have a structure which is made up of a plastic injection material and sealed by being mutually coupled. Meanwhile, although it is preferred that the first bracket 10 and the second bracket 20 be sealed by ultrasonic fusion and coupled to each other so as to prevent the moisture from penetrating into the interior of the first bracket 10 and the second bracket 20, it is not necessarily limited to the ultrasonic fusion, and it is also possible to apply various coupling types that are performed by applying a curable adhesive material, a sealing material, a thread-bolt coupling, forced fitting or the like either alone or jointly. In this specification, the coupling using the ultrasonic fusion will be described as an example.

Inside the first bracket 10 and the second bracket 20 coupled to each other by the ultrasonic fusion, a rotor 1, a stator 2, a shaft 3 and a printed circuit board 4 are located. Coils (not shown) wound around the stator 2 is electrically connected to the printed circuit board 4, and a wire 4a is drawn from the printed circuit board 4 so as to be electrically connected to an external power supply or the like from the printed circuit board 4.

A first bearing insertion space (see reference numeral 12 in FIG. 3) is formed inside an upper portion of the center of the first bracket 10, and the first bearing 31 is inserted into the first bearing insertion space. Further, the first bearing insertion space 12 is covered by a first bearing cover 40 coupled to the lower portion thereof. A hole through which the shaft passes is formed in the center of the first bearing cover 40.

In the outer lower portion of the center of the second bracket 20, a second bearing insertion space (see reference numeral 22 in FIG. 3) is formed, and a second bearing (see reference numeral 32 in FIG. 3) is inserted into the second bearing insertion space. In addition, the second bearing insertion space 22 is covered by a second bearing cover (see reference numeral 50 in FIG. 3) coupled to the lower portion thereof.

Figure 3:
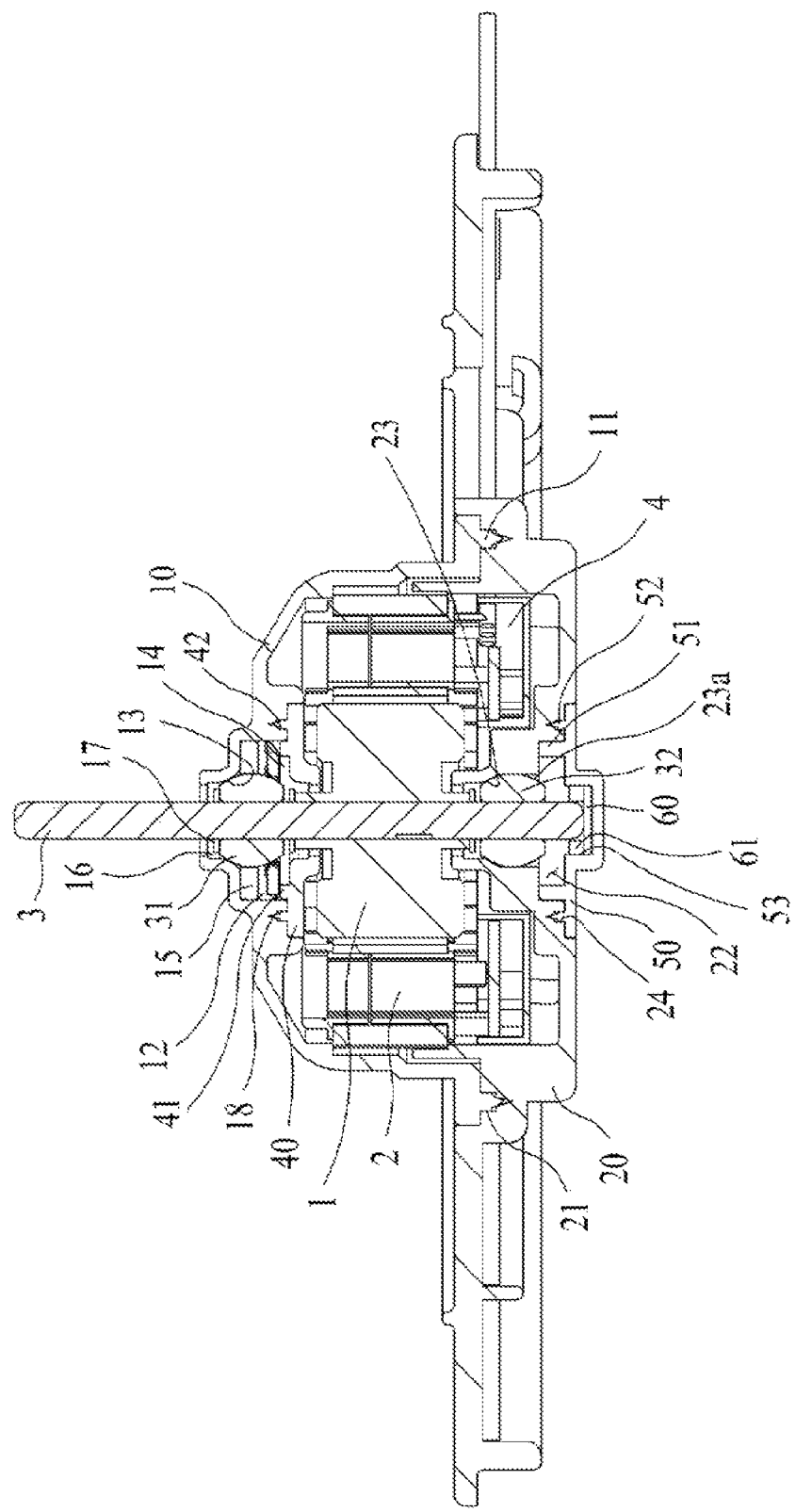
FIG. 3 is a cross-sectional view illustrating a cross-section of a fan motor according to an embodiment of the present invention.

FIG. 3 is a cross-sectional view illustrating the fan motor according to an embodiment of the present invention.

Referring to FIG. 3, in the fan motor according to an embodiment of the present invention, as described above, the first bracket 10 and second bracket 20 are coupled to each other to form one motor housing. The first bracket 10 and the second bracket 20 are preferably sealing-coupled by ultrasonic fusion. For the ultrasonic fusion, a bracket fusion groove 21 is formed on the upper surface of the second bracket 20, and a bracket fusion protrusion 11 is formed at a position corresponding to the bracket fusion groove 21 of the second bracket 20 on the lower surface of the first bracket 10.

Thus, after inserting the bracket fusion protrusion 11 into the bracket fusion groove 21, when heat is applied to the bracket fusion protrusion 11 by applying ultrasonic wave thereto, since the bracket fusion protrusion 11 is melted and stuck to the bracket fusion groove, a coupling part between the first and second brackets 10, 20 is sealed. Of course, it is also possible to form a fusion groove on a lower surface of the first bracket 10 and to form a fusion protrusion on an upper surface of the second bracket 20.

Here, as described above, as the first bracket 10 is coupled to the second bracket 20 by ultrasonic fusion, devices that generate a lot of heat during operations, such as the rotor 1, the stator 2 and the printed circuit board 4, are housed inside the first and second brackets 10, 20. Accordingly, it is preferred that the first and second brackets 10, 20 be manufactured with a flame-retardant resin material for fire prevention.

The shaft 3 is located through the centers of the first bracket 10 and the second bracket 20. Rotation of an upper portion of the shaft 3 is supported by a first bearing 31 located inside the center of the first bracket 10, and rotation of a lower portion of the shaft 3 is supported by a second bearing 32.

The first bearing 31 is inserted into the first bearing insertion space 12 of the first bracket 10, and is fixed by being press-fitted to a first bearing press-fit portion 13 which is formed inside the center of the first bracket 10. The lower portion of the first bearing 31 is supported by a board push 14. Also, a felt 15 is positioned on an outer peripheral surface of the first bearing 31, and the felt 15 keeps oil for smooth rotation of the bearing. The first bearing insertion space 12 as a space, into which the first bearing 31 is inserted, is sealed and covered by a first bearing cover 40. In the interior of the center of the first bearing cover 40, i.e., on the inside of a first fusion protrusion 42, a projecting part capable of supporting the board push 14 is formed. Further, in the upper portion of the first bearing press-fit portion 13, an oil return washer insertion portion 16 is formed, and an oil return washer 17 is inserted into the oil return washer insertion portion 16, thereby preventing oil from flowing out to the upper side of the first bearing 31.

For primary coupling of the first bearing cover 40, the first bearing cover 40 is formed with a first press-fit protrusion 41 to protrude at a position corresponding to the inner circumferential periphery portion of the first bearing insertion space 12. The first press-fit protrusion 41 may be a number of individual protrusions and may have a shape projecting in one circumferential shape. The first press-fitting protrusion 41 is primarily coupled by being press-fitted around the inner circumference of the first bearing insertion space 12.

Furthermore, for secondary coupling, a first fusion groove 18 is formed in the inner surface center of the first bracket 10, and the first bearing cover 40 is formed with a first fusion protrusion 42 at a position corresponding to the position of the first fusion groove 18. The first fusion protrusion 42 is coupled by being fused and sealed to the first fusion groove 18 by ultrasonic fusion. Of course, the first fusion protrusion 42 may be formed as a form of a fusion groove, and the first fusion groove 18 may be formed as a form of a fused protrusion. Meanwhile, although it is preferred that the first bearing cover 40 and the first bracket 10 be coupled to each other by being sealed through the ultrasonic fusion as described above, it is not necessarily limited to the ultrasonic fusion, and it is also possible to apply various coupling types that are performed by applying a curable adhesive material, a sealing material, a thread-bolt coupling, forced fitting or the like either alone or jointly.

The second bearing 32 is located in the second bearing insertion space 22 formed in the center of the lower surface of the second bracket 20, and the upper portion and the side surface portion of the second bearing 32 are fixed by being press-fitted into the second bearing press-fit portion 23 formed in the upper portion of the center of the second bearing insertion space 22. The lower portion of the second bearing 32 is supported by a plurality of fixing protrusions 23a. A felt configured to supply oil as lubricating oil for the rotational support of the bearing is not installed on the outer circumferential surface of the second bearing 32, and the second bearing press-fit portion 23 abuts against the outer circumferential surface. Further, an oil return washer commonly coupled to the upper portion of the second bearing press-fit portion 23 may be omitted. The fixing protrusion 23a supports the lower portion of the second bearing 32, and the number of the fixing protrusions 32a is not particularly limited, but it is preferred to use three fixing protrusions 23a as in FIG. 4.

The second bearing insertion space 22 of the second bracket 20, in which the second bearing 32 is located, is covered by the second bearing cover 50 and sealed at the same time and coupled. The second bearing cover 50 is formed with the second press-fit protrusion 51 at a position corresponding to the periphery of the second bearing insertion space 22. The second press-fitting protrusion 51 may be a number of individual protrusions and may have a shape projecting in one circumferential shape. The second press-fitting protrusion 51 is coupled by being press-fitted around the inner periphery of the second bearing insertion space 22. Preferably, the distal end of the second press-fitting protrusion 51 may abut against the lower surface of the second bracket 20, i.e., the open surface of the second bearing insertion space 22, in view of the coupling force and sealing. Meanwhile, the second bearing cover 50 needs to isolate the second bearing insertion space 22 by being sealed from the outside in order to prevent the penetration of moisture or the like thereinto.

For this, a second fusion groove 24 is formed on the lower surface of the second bracket 20, and a second fusion protrusion 52 is formed on the upper surface of the second bearing cover 50 at a position corresponding to the second fusion groove 24. After inserting the second fusion protrusion 52 into the second fusion groove 24, when heat is applied to the second fusion protrusions 52 by applying the ultrasonic wave thereto, the second fusion protrusions 52 is melt and stuck to the second melt fusion groove 24. Accordingly, the second bearing cover 50 is coupled to a lower surface of the second bracket 20 to isolate the second bearing insertion space 22 from the outside, thereby making it possible to prevent penetration of external moisture thereinto. Of course, it is also possible to form the fusion protrusion on the lower surface of the second bracket 20 and to form the fusion groove on the upper surface of the second bearing cover 50. Meanwhile, although it is preferred that the second bearing cover 50 and the second bracket 20 be coupled to each other by being sealed through the ultrasonic fusion as described above, it is not necessarily limited to the ultrasonic fusion, and it is also possible to apply various coupling types that are performed by applying a curable adhesive material, a sealing material, a thread-bolt coupling, forced fitting or the like either alone or jointly In this way, when the second bearing cover 50 is coupled to the lower surface of the second bracket 20, a distal end of the shaft 3 penetrating the center of the second bracket 20 is located in the accommodation space 53 that extends downward and is formed on the inside of the center of the second bearing cover 50.

Here, although FIG. 3 illustrates that the board push 14 supports the lower portion of the first bearing 31 and the felt 15 is coupled to the side outer circumferential surface of the first bearing 31, like the coupling structure of the second bearing 32, the board push 14 for supporting the first bearing 31 and the felt 15 of the outer circumferential surface may be omitted. In this case, it is preferred to apply an oil-less bearing to the first bearing 31, and the oil return washer 17 can also be omitted. At this time, the first bearing press-fit portion 13 extends so as to support the side surface portion of the first bearing 31 similarly to the second bearing press-fit portion 23, and the lower portion of the first bearing 31 is supported by a plurality of fixing protrusions formed at the lower end of the first bearing press-fit portion 13.

Meanwhile, the shaft 3 rotates at a high speed together with the rotation of the rotor 1 in accordance with the operation of the fan motor, and the shaft 3 can vertically moves in accordance with the rotation operation. Such a movement becomes a cause of noise and vibration generated during operation of the motor. A structure for preventing this will be described with reference to FIG. 4.

Figure 4:
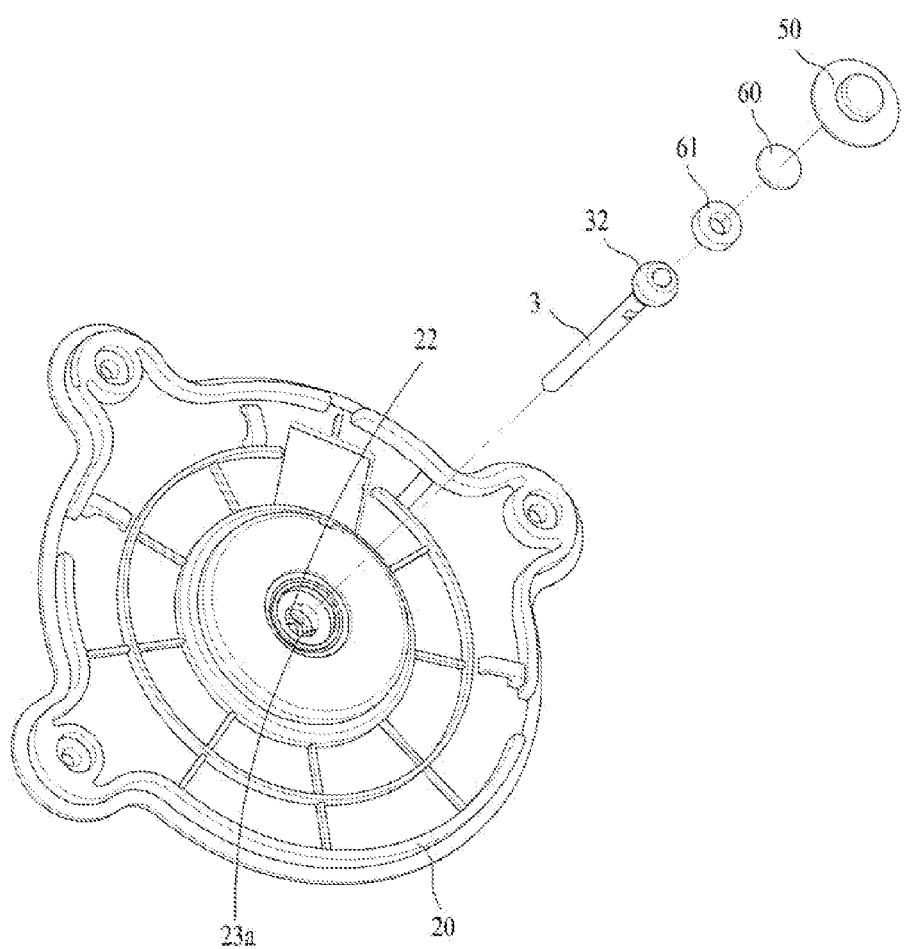
FIG. 4 is a perspective view illustrating a state in which a second bearing cover of the fan motor according to one embodiment of the present invention is disassembled.

FIG. 4 is a perspective view illustrating a state in which a second bearing cover 50 of the fan motor according to one embodiment of the present invention is disassembled.

Referring to FIGS. 3 and 4 together, in the center of the second bearing cover 50, an accommodation space 53 formed inside by extending downward is formed. An attracting magnet 60 is inserted and fixed into the accommodation space 53. A spacer 61 is located around the upper portion of the attracting magnet 60 and around the lower end of the shaft 3. The attracting magnet 60 exerts a constant force of drawing the shaft 3 to prevent the shaft 3 from moving upward. The spacer 61 serves to fix the attracting magnet 60 in position, and it can also be applied by selecting a suitable material such as resin or a rubber material. Meanwhile, a separate magnet of the same material as the attracting magnet 60 may be applied to the spacer 61. Meanwhile, the spacer 61 can also be one magnet integrally with the attracting magnet 60.

Figure 5:
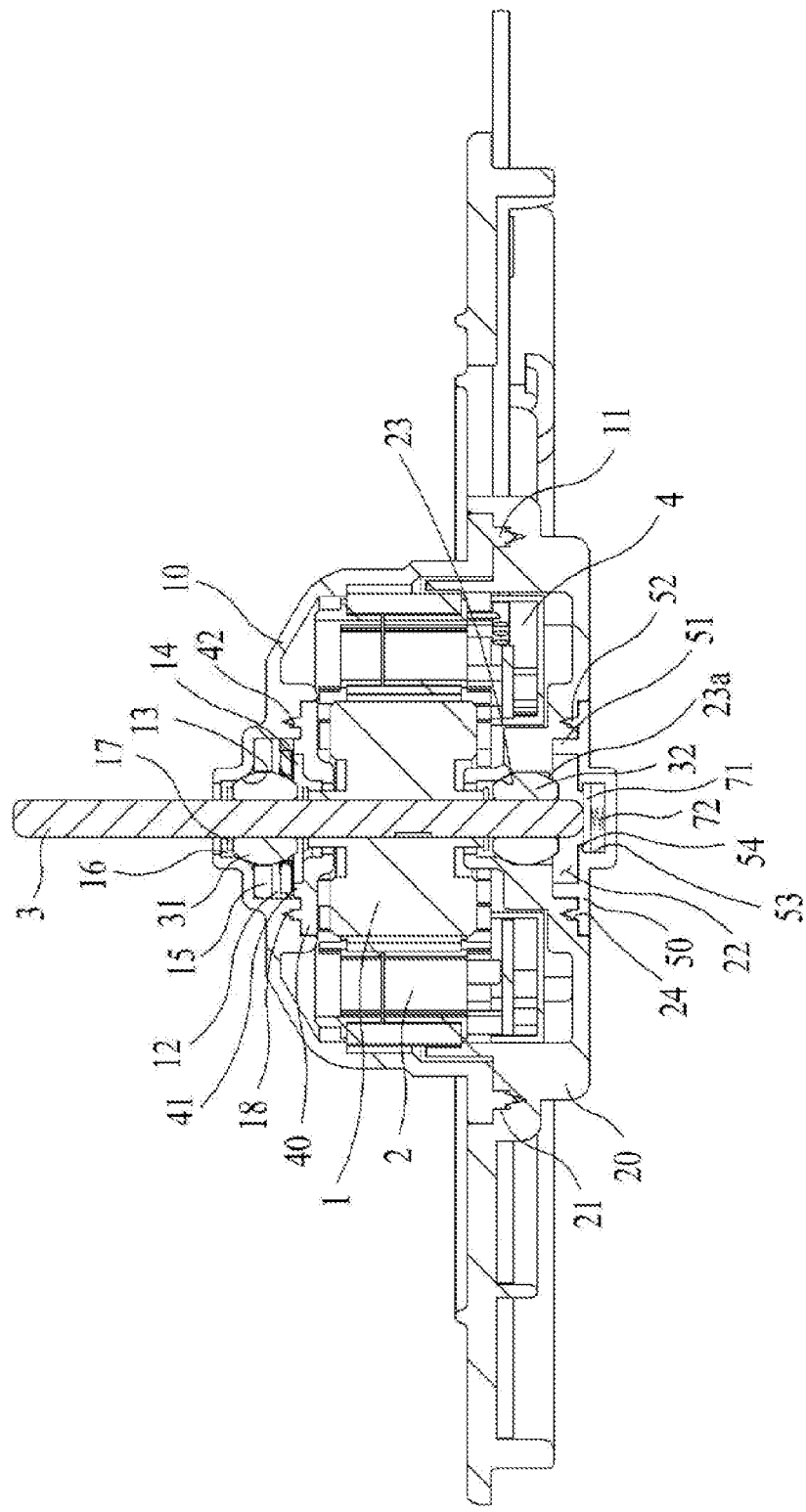
FIG. 5 is a cross-sectional view illustrating a cross-section of a fan motor according to another embodiment of the present invention.
Figure 6:
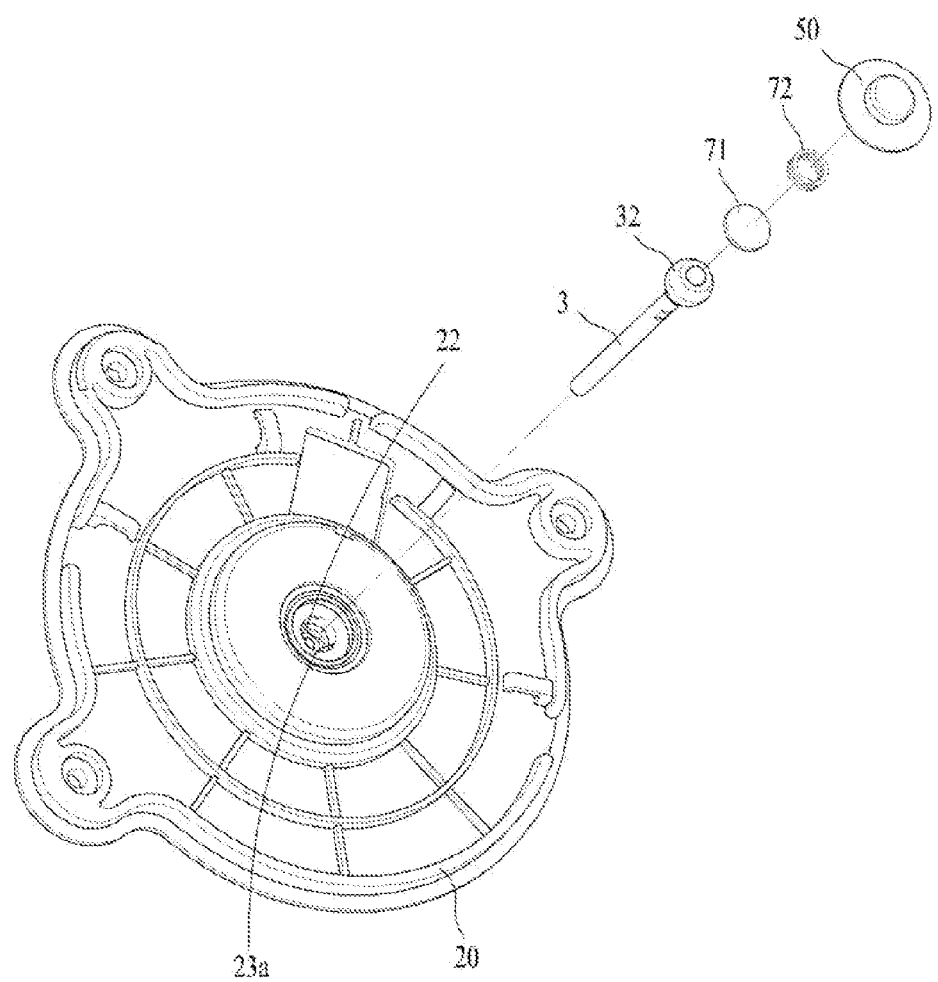
FIG. 6 is a perspective view illustrating a state in which a second bearing cover of the fan motor according to another embodiment of the present invention is disassembled.

FIG. 5 is a cross-sectional view illustrating a cross-section of a fan motor according to another embodiment of the present invention, and FIG. 6 is a perspective view illustrating a state in which a second bearing cover 50 of the fan motor according to another embodiment of the present invention is disassembled.

As illustrated in FIGS. 5 and 6, the fan motor according to another embodiment of the present invention is identical to the motor according to one embodiment, except that some configurations installed in the accommodation space 53 of the second bearing cover 50 differ. Specifically, a support plate 71 is installed above the accommodation space 53 formed in the second bearing cover 50, a spring 72 is installed below the support plate 71, and the spring 72 pushes the support plate 71 upward. The upper portion of the support plate 71 is supported by a stopper 54 formed around the upper portion of the accommodation space 53. The stopper 54 may be formed in a number of individual shapes and may be formed in one circumferential shape. The stopper 54 is preferably formed integrally with the second bearing cover 50. When the shaft 3 moves downward, the support plate 71 pushes the lower end of the shaft 3 upward by elasticity of the spring 72 that pushes the support plate 71 from the lower portion, thereby preventing the movement of the shaft 3. Although a material of the support plate 71 is not particularly limited, it is possible to apply a plastic resin, a rubber material or the like that has high wear resistance. Meanwhile, the support plate 71 may be formed as a magnet. When applying the support plate 71 as a magnet, since the shaft 3 is pulled by an attractive power, it is possible to effectively prevent the vertical movement of the shaft 3 and to prevent noise and vibration through the stable rotation.

The present invention has an effect of providing a fan motor which is capable of reducing the manufacturing costs and preventing the axial movement of the shaft, by not applying the insert injection for fabrication of the motor housing.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fan motor comprising:
 a rotor that is coupled with a shaft to rotate together;
 a stator that is installed at a position facing the rotor;
 a first bracket on a central upper portion of which a first bearing insertion space into which a first bearing coupled to an upper portion of the shaft is inserted is formed;
 a second bracket which is hermetically coupled to the first bracket and on a central lower portion of which a second bearing insertion space into which a second bearing coupled to a lower portion of the shaft is inserted is formed;
 a first bearing cover that covers the first bearing insertion space; and
 a second bearing cover that covers the second bearing insertion space and has an accommodation space formed to extend to the central lower portion,
 wherein the second bearing is coupled so as to abut against an upper portion and a side surface portion of the second bearing press-fit portion, and wherein
 an attracting magnet is fixed to a lower portion of the accommodation space, and a ring-shaped spacer is formed and located around the upper portion of the attracting magnet, and wherein
 the attracting magnet is configured to exert a constant force for drawing the shaft by preventing the shaft from moving upward.

2. The fan motor of claim 1, wherein the first bearing is supported by the first bearing press-fit portion formed in the first bearing insertion space, and the first bearing press-fit portion may abut against the upper portion and the side surface of the first bearing.

3. The fan motor of claim 1, wherein the attracting magnet and the spacer are formed integrally.

4. A fan motor comprising:
 a rotor that is coupled with a shaft to rotate together;
 a stator that is installed at a position facing the rotor;
 a first bracket on a central upper portion of which a first bearing insertion space into which a first bearing coupled to an upper portion of the shaft is inserted is formed;
 a second bracket which is hermetically coupled to the first bracket and on a central lower portion of which a second bearing insertion space into which a second bearing coupled to a lower portion of the shaft is inserted is formed;
 a first bearing cover that covers the first bearing insertion space; and
 a second bearing cover that covers the second bearing insertion space and has an accommodation space formed to extend to the central lower portion,
 wherein the second bearing is coupled so as to abut against an upper portion and a side surface portion of the second bearing press-fit portion, and wherein
 a spring is installed in the lower portion of the accommodation space, and a support plate is installed in the upper portion of the spring, and wherein
 the spring pushes the support plate upward, and the support plate comprises a magnet to exert a constant force for drawing the shaft by preventing the shaft from moving upward.

5. The fan motor of claim 4, further comprising:
 a stopper configured to support the upper portion of the support plate and formed in the upper portion of the accommodation space.

* * * * *